US011094311B2

(12) United States Patent
Candelore et al.

(10) Patent No.: US 11,094,311 B2

(45) Date of Patent: Aug. 17, 2021

(54) SPEECH SYNTHESIZING DEVICES AND METHODS FOR MIMICKING VOICES OF PUBLIC FIGURES

(71) Applicant: Sony Corporation, Tokyo (JP)

(72) Inventors: Brant Candelore, Escondido, CA (US); Mahyar Nejat, San Diego, CA (US)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 16/411,930

(22) Filed: May 14, 2019

(65) Prior Publication Data

US 2020/0365136 A1 Nov. 19, 2020

(51) Int. Cl.

*G10L 15/22* (2006.01)
*G10L 13/00* (2006.01)
*G10L 13/033* (2013.01)
*G10L 13/047* (2013.01)

(52) U.S. Cl.

CPC ............ *G10L 13/033* (2013.01); *G10L 13/00* (2013.01); *G10L 13/047* (2013.01)

(58) Field of Classification Search

CPC .................................. G10H 1/36; G10L 13/04
See application file for complete search history.

(56) References Cited

U.S. PATENT DOCUMENTS 5,251,251 A * 10/1993 Barber ................. H04M 1/642 379/355.08
6,394,872 B1 5/2002 Watanabe et al.
6,807,291 B1 10/2004 Tumey et al.
7,020,310 B2 3/2006 Tumey et al.
7,062,073 B1 6/2006 Tumey et al.
7,865,365 B2 1/2011 Anglin et al.
8,131,549 B2 3/2012 Teegan et al.
8,666,746 B2 3/2014 Bangalore et al.
9,087,512 B2 7/2015 Chen et al.
10,176,798 B2 1/2019 Gueta et al.
10,410,621 B2 9/2019 Li
10,510,358 B1 12/2019 Barra-Chicote et al.
2002/0111808 A1 8/2002 Feinberg
2003/0123712 A1* 7/2003 Dimitrova ........... G06F 16/7844 382/118

(Continued)

FOREIGN PATENT DOCUMENTS

CN 102693729 B 9/2014

OTHER PUBLICATIONS

Brant Candelore, Mahyar Nejat, "Speech Synthesizing Devices and Methods for Mimicking Voices of Children for Cartoons and Other Content", related U.S. Appl. No. 16/432,660, Non-Final Office Action dated Nov. 3, 2020.

(Continued)

*Primary Examiner* — Shreyans A Patel
(74) *Attorney, Agent, or Firm* — John L. Rogitz; John M. Rogitz

(57) ABSTRACT

Speech synthesizing devices and methods are disclosed for mimicking the voices of public figures. A text-to-speech deep neural network (DNN) can be used to do so, with the DNN being trained using publicly available audio recordings of a given public figure speaking as well as text corresponding to the words that are spoken by the public figure in the audio recordings. The DNN may then be used to produce various audio outputs in the voice of the public figure.

19 Claims, 5 Drawing Sheets

(56) References Cited

U.S. PATENT DOCUMENTS

| | | | | |
|---|---|---|---|---|
| 2006/0074672 | A1* | 4/2006 | Allefs | G10L 13/04 704/258 |
| 2006/0095265 | A1* | 5/2006 | Chu | G10L 13/033 704/268 |
| 2006/0285654 | A1* | 12/2006 | Nesvadba | H04N 21/440236 379/67.1 |
| 2007/0218986 | A1* | 9/2007 | Van Luchene | A63F 13/792 463/30 |
| 2011/0070805 | A1 | 3/2011 | Islava | |
| 2012/0014553 | A1* | 1/2012 | Bonanno | G10L 15/00 381/364 |
| 2013/0034835 | A1* | 2/2013 | Min | G06Q 50/20 434/169 |
| 2013/0282376 | A1 | 10/2013 | Nonaka | |
| 2014/0038489 | A1 | 2/2014 | Sharma et al. | |
| 2015/0199978 | A1 | 7/2015 | McCoy et al. | |
| 2016/0021334 | A1 | 1/2016 | Rossano et al. | |
| 2016/0104474 | A1 | 4/2016 | Bunn et al. | |
| 2016/0365087 | A1* | 12/2016 | Freud | G10L 13/10 |
| 2017/0309272 | A1 | 10/2017 | Vanreusel et al. | |
| 2018/0272240 | A1 | 9/2018 | Soudek et al. | |
| 2019/0005024 | A1* | 1/2019 | Somech | H04L 51/36 |
| 2019/0147838 | A1* | 5/2019 | Serletic, II | G10H 1/368 704/260 |
| 2019/0304480 | A1 | 10/2019 | Narayanan et al. | |
| 2020/0211565 | A1 | 7/2020 | Dubinsky et al. | |
| 2020/0234689 | A1 | 7/2020 | Lai | |
| 2020/0251089 | A1 | 8/2020 | Pinto | |
| 2020/0265829 | A1 | 8/2020 | Liu et al. | |

OTHER PUBLICATIONS

Candelore et al., "Speech Synthesizing Dolls for Mimicking Voices of Parents and Guardians of Children", related U.S. Appl. No. 16/432,683, Applicant's response to Non-Final Office Action filed Oct. 27, 2020.

Candelore et al., "Speech Synthesizing Dolls for Mimicking Voices of Parents and Guardians of Children", related U.S. Appl. No. 16/432,683, Non-Final Office Action dated Sep. 23, 2020.

Brant Candelore, Mahyar Nejat, "Speech Synthesizing Devices and Methods for Mimicking Voices of Children for Cartoons and Other Content", related U.S. Appl. No. 16/432,660, Applicant's response to Non-Final Office Action filed Jan. 11, 2021.

Candelore et al., "Speech Synthesizing Dolls for Mimicking Voices of Parents and Guardians of Children", related U.S. Appl. No. 16/432,683, Applicant's response to Final Office Action filed Jan. 8, 2021.

Candelore et al., "Speech Synthesizing Dolls for Mimicking Voices of Parents and Guardians of Children", related U.S. Appl. No. 16/432,683, Final Office Action dated Dec. 30, 2020.

"Baidu AI Can Clone Your Voice in Seconds", Medium, Feb. 21, 2018.

"Brainy Voices: Innovative Voice Creating Based on Deep Learning by Acapela Group Research Lab", Acapela Group, Jun. 29, 2017.

"Personalized Virtual Assistants for the Elderly: Acapela is Working on Adaptive Expressive Voices for the Empathic Research Project", Acapela Group, Sep. 4, 2018.

"Repertoire", Acapela Group, Date Unknown.

"Speech Impairment: Acapela DNN Technology Enhances the Voice Banking Process of My-Own-Voice", Acapela Group, Oct. 4, 2018.

Brant Candelore, Mahyar Nejat, "Speech Synthesizing Devices and Methods for Mimicking Voices of children for Cartoons and Other Content", file history of related U.S. Appl. No. 16/432,660, filed Jun. 5, 2019.

Brant Candelore, Mahyar Nejat, "Speech Synthesizing Dolls for Mimicking Voices of Parents and Guardians of Children", file history of related U.S. Appl. No. 16/432,683, filed Jun. 5, 2019.

* cited by examiner

SPEECH SYNTHESIZING DEVICES AND METHODS FOR MIMICKING VOICES OF PUBLIC FIGURES

FIELD

The present application relates to technically inventive, non-routine text-to-speech solutions that are necessarily rooted in computer technology and that produce concrete technical improvements.

BACKGROUND

Currently, any consumer electronics device-based text-to-speech systems employ automated and robotic-sounding voices to provide audio output. Sometimes those voices use an accent or unfamiliar tone that makes it difficult for a given person to understand the information that the device is attempting to convey to the person. There are currently no adequate solutions to the foregoing computer-related, technological problem.

SUMMARY

Present principles involve using speech synthesizing devices and methods to duplicate the voices of public figures or celebrities (including e.g., their accents, tones, etc.). A text-to-speech deep neural network (DNN) can be used to do so, where the DNN may be trained using publicly available audio recordings of a given public figure speaking as well as text corresponding to the words that are spoken by the public figure in the audio recordings. The DNN may then be used to produce various other audio outputs in the voice of the public figure.

Accordingly, in one aspect an apparatus includes at least one computer memory that is not a transitory signal and that includes instructions executable by at least one processor to extract recorded speech of a celebrity from at least one piece of content that is publicly available. The instructions are also executable to analyze the recorded speech of the celebrity and, based on the analysis, configure an artificial intelligence model that can mimic the voice of the celebrity to output additional speech in the voice of the celebrity. The model may be stored and also made available to devices.

In some examples, the instructions may be executable to analyze the recorded speech to train at least one neural network to mimic the voice of the celebrity, with the artificial intelligence model including the at least one neural network. The at least one neural network may at least in part be trained unsupervised. Furthermore, in some embodiments the at least one neural network may be trained unsupervised at least in part using text that indicates words spoken by the celebrity in the recorded speech, where the text may be associated with closed captioning data corresponding to the recorded speech. The at least one neural network may also be trained unsupervised using the recorded speech of the celebrity, where the recorded speech of the celebrity may be extracted based on identification of the recorded speech as not including speech from other speakers during one or more segments of the recorded speech. The one or more segments themselves may be identified, for instance, based at least in part on a spoken introduction of the celebrity that precedes the one or more segments or a spoken reference to the celebrity that precedes the one or more segment.

Additionally, or alternatively, the at least one neural network may be trained at least in part as supervised by a human, with the at least one processor receiving an indication from the human that the recorded speech is that of the celebrity.

Still further, the recorded speech of the celebrity may be extracted from a movie, a television show, other publicly available audio video (AV) content, and/or a publicly available audio recording.

The additional speech itself may be output using text-to-speech software and text accessible to the at least one processor. Thus, in some examples the apparatus may include the at least one processor as well as at least one speaker through which the additional speech may be output.

Additionally, in some embodiments the neural network may create a model of the celebrity which may be shared with other devices with text-to-speech engines.

In another aspect, a method includes analyzing, using a device, words spoken by a public figure. The method also includes, based on the analysis, configuring a speech synthesizer to duplicate the public figure's voice for producing audio corresponding to text accessible to the device.

In still another aspect, an apparatus includes at least one computer readable storage medium that is not a transitory signal. The at least one computer readable storage medium includes instructions executable by at least one processor to use a trained deep neural network (DNN) to produce a representation of a public figure's voice as speaking audio corresponding to first text that is either presented on an electronic display, second text from Closed Captioning, or that is to be used by a digital assistant as part of a response to a query. The trained DNN is trained using both audio of words spoken by the public figure and second text corresponding to the words, where the first text is different from the second text.

The details of the present application, both as to its structure and operation, can best be understood in reference to the accompanying drawings, in which like reference numerals refer to like parts, and in which:

DETAILED DESCRIPTION

Figure 1:
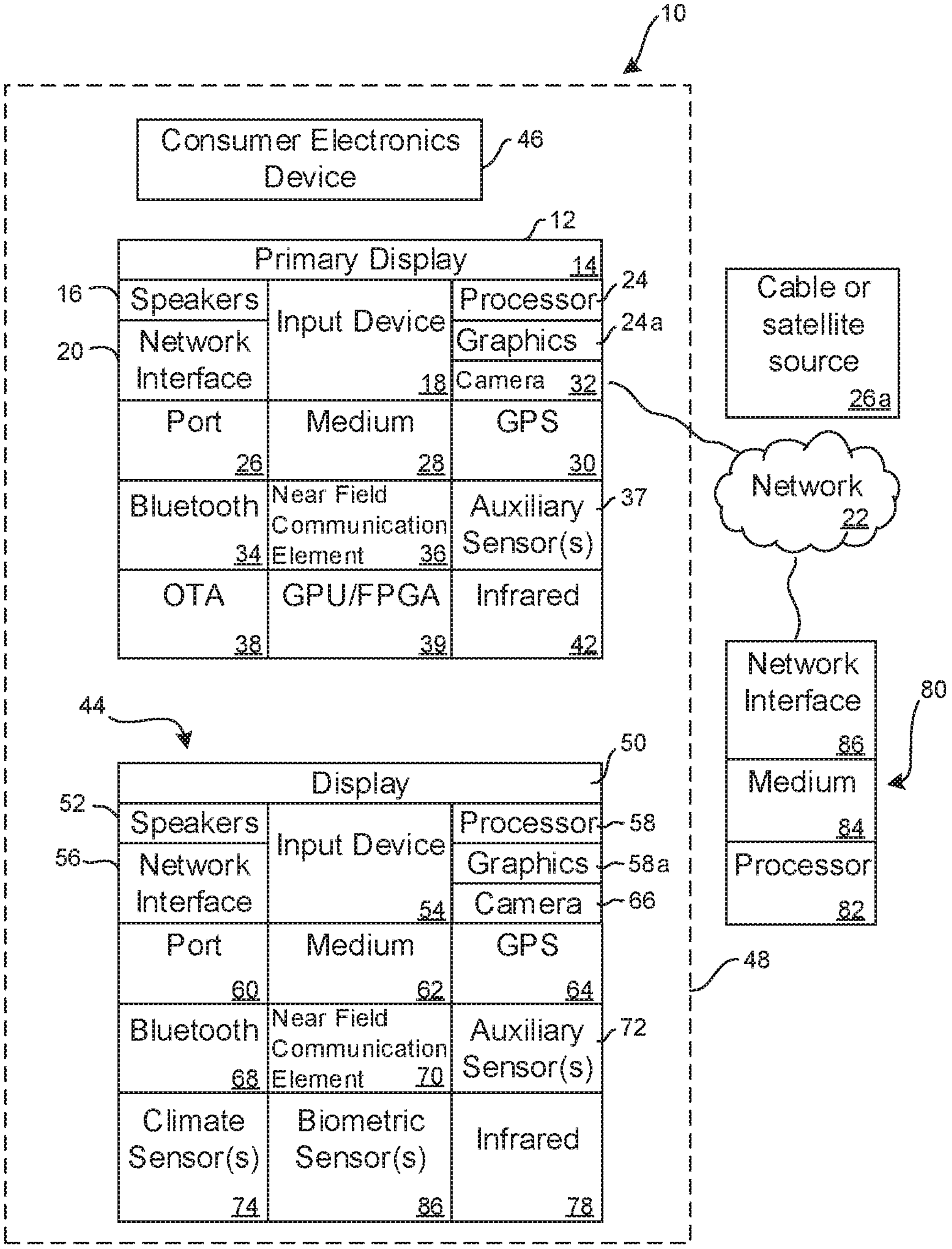
FIG. 1 is a block diagram of an example system in accordance with present principles.

In accordance with present principles, text-to-speech (TTS) on a TV or another device or digital assistant can be given the accent and voice patterns of any movie star or celebrity like Clint Eastwood, Albert Einstein, etc. and can be changed on-the-fly. The expected text can be pre-canned (static) such as in the on-screen displays (OSDs) or announcement of error/status messages, or dynamic, e.g.

such as in reading the description of a movie or reciting programs from an electronic TV guide. The speech may thus not be pre-recorded but rather synthesized from text on-the-fly either locally on the device and/or at a remote server. Static messages may be pre-processed if desired and can change with the user's selection of a voice. This may be done by using a number of recordings of the public figure in order to characterize the public figure's voice and to tailor the synthetic voice output mechanism. The recordings may be in the form of dialogue in movies (e.g., where the actor has since passed away), recorded interviews, etc. The TTS engine(s) in the device may therefore be able to be "re-skinned" with the profile of the individual(s) whose voice will be cloned.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalent se top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver based on 5G, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source **26*a* of audio video content. Thus, the source 26*a* may be, e.g., a separate or integrated set top box, or a satellite receiver. Or, the source 26*a*** may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVM) 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVM 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) and/or a field-programmable gate array (FPGA) 39. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or UPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or UPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22. and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
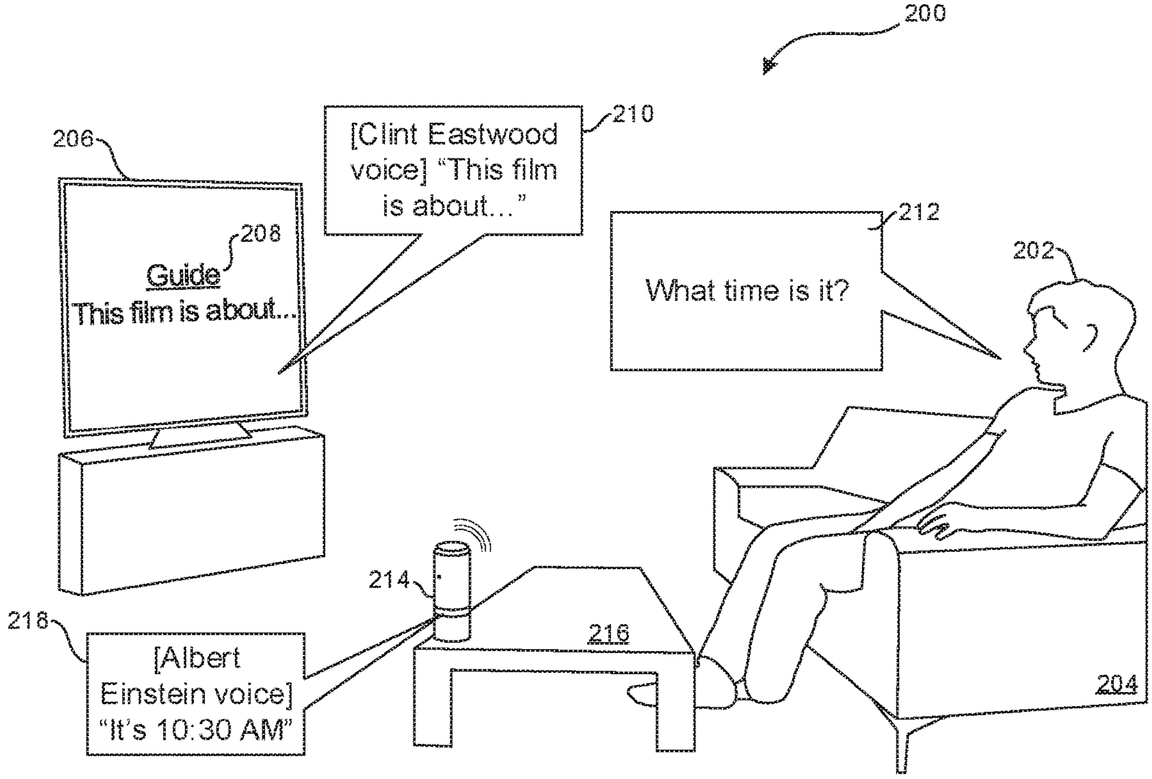
FIG. 2 is an example illustration of a user listening to various audible outputs from devices that duplicate the voice of a public figure consistent with present principles.

FIG. 2 shows an example illustration 200 in accordance with present principles. As shown, a user 202 is sitting on a couch 204 while viewing a television display 206. The television display 206 is presenting informational typeface text 208 from a television channel guide regarding a particular film selected by the user 202 via a remote control. The text 208 indicates "This film is about . . . " along with ensuing text not shown for simplicity.

According to present principles, this text 208 may be converted to speech in the voice of Clint Eastwood by the television display 206 and/or another device that is in communication with the display 206, such as a server. Thus, speech bubble 210 illustrates the simulated voice of Clint Eastwood speaking the text 208.

Also, according to present principles, the user 202 might provide a query to a stand-alone digital assistant device 214 that sits on a coffee table 216. In response to the query asking what is the current time of day (itself represented by the speech bubble 212), the digital assistant device may simulate the voice of Albert Einstein to speak the current time of day as represented by speech bubble 218.

Figure 3:
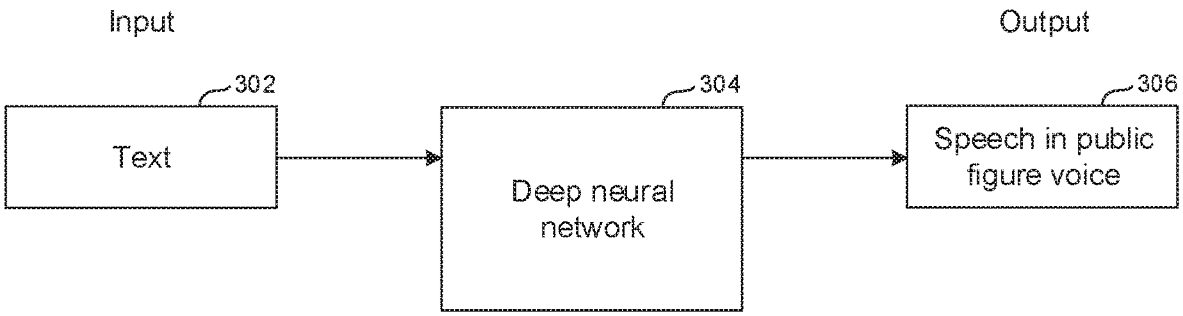
FIG. 3 is an example block diagram of a text-to-speech synthesizer system consistent with present principles.

FIG. 3 is an example simplified block diagram of a text-to-speech synthesizer system 300 according to present principles. The text-to-speech synthesizer system 300 may be incorporated into any of the devices disclosed herein, such as the AVDD 12 and/or server 80, for undertaking present principles. As shown, text 302 may be provided as input to an artificial intelligence model 304 that may be established at least in part by a neural network. For example, the neural network may be a deep neural network (DNN) having multiple hidden layers between input and out layers, and in some embodiments the neural network may even be a deep recurring neural network (DRNN) specifically. As also shown in FIG. 3, the DNN 304 may convert the text 302 into speech 306 as output in the voice of a given public figure or celebrity for which the DNN 304 has been trained.

Further describing the DNN 304, in some examples it may include components such as text analysis, prosody generation, unit selection, and waveform concatenation. Also, in some examples, the DNN may specifically be established at least partially by the Acapela DNN (sometimes referred to as "My-Own-Voice"), a text-to-speech engine produced by Acapela. Group of Belgium, or equivalent.

Figure 4:
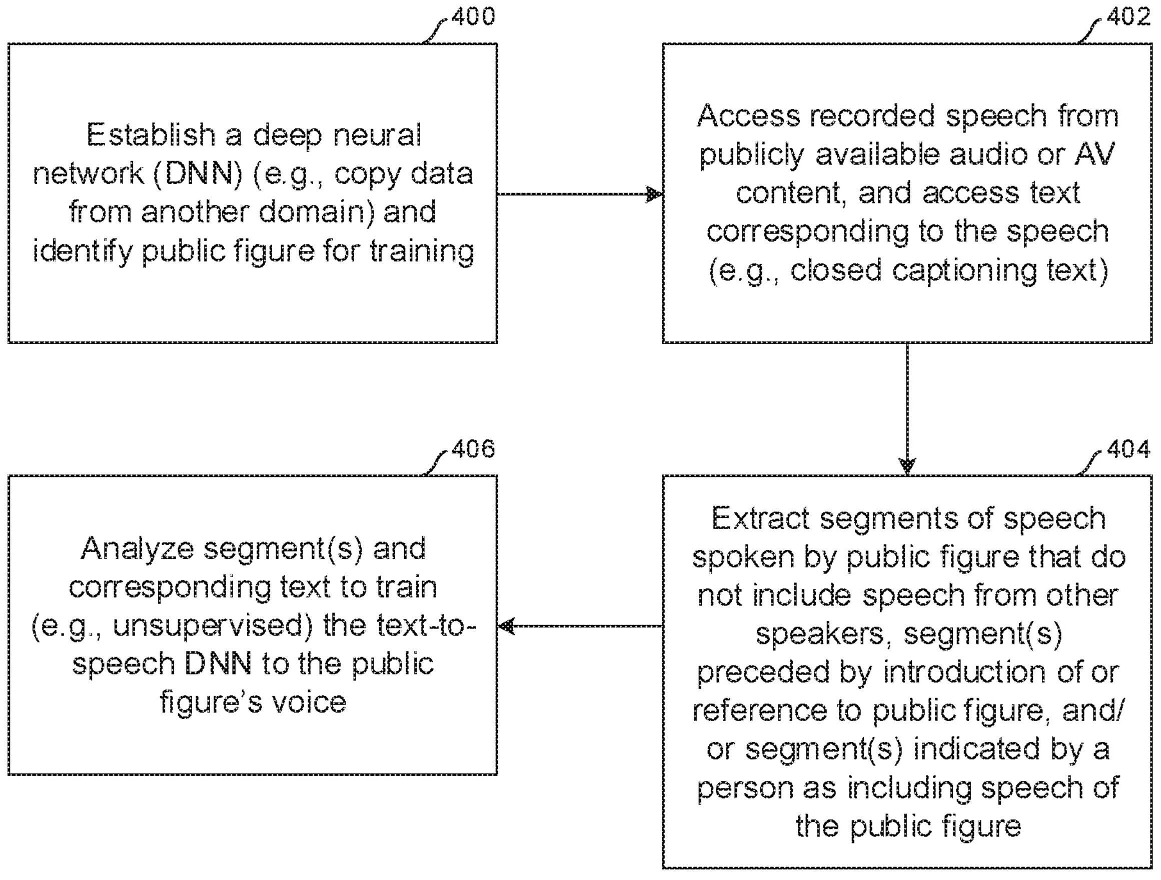
FIG. 4 is a flow chart of example logic for training a DNN to mimic the voice of a public figure consistent with present principles.

Referring now to FIG. 4, a flow chart of example logic is shown for a device to configure an artificial intelligence model to mimic the voice of a celebrity or other public figure to output speech in the voice of the celebrity in accordance with present principles. The device executing the logic of FIG. 4 (and FIG. 5 for that matter) may be any of the devices disclosed herein, such as the AVDD 12 and/or the server 80.

Beginning at block 400, the device may establish a DNN and identify a public figure for which the DNN is to be trained. To establish the DNN at block 400, for example, the device may access a base copy of the Acapela "My-Own-Voice" DNN. Additionally, or alternatively, the device may copy a domain from another text-to-speech engine.

Figure 6:
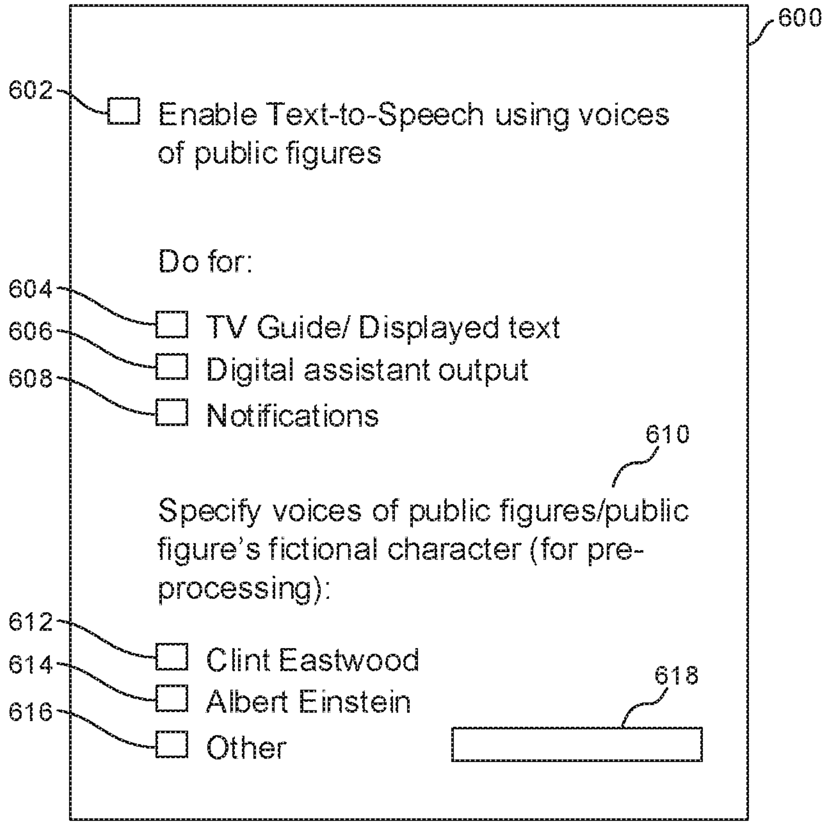
FIG. 6 is an example graphical user interface (GUI) for a user to configure settings of a device operating according to present principles and to select a public figure to mimic consistent with present principles.

To identify the public figure at block 400 for which the DNN is to be trained, the device may receive input from a user specifying the public figure, such as voice input or touch input directed to a graphical user interface (GUI) like the example GUI shown in FIG. 6.

From block 400 the logic may then proceed to block 402 where the device may access recorded speech of the public figure that is publicly available. For example, at block 402 the device may perform an Internet search (e.g., using an Internet search engine) using the name of the public figure for audio video (AV) content or audio content in which the public figure is speaking. In some examples, at block 402 the device may specifically perform a video search using both the name of the public figure and a video search function in an Internet search engine, e.g., Google.

Additionally, or alternatively, to access recorded speech at block 402 the device may access another publicly accessible database or archive of content (e.g., a movie database or podcast database) and perform a keyword search using the public figure's name to identify recorded speech of the public figure. Still further, the user may specify via voice or text input to the device which pieces of recorded speech to use, e.g., a movie, television show, podcast, etc. to identify recorded speech of the public figure.

Also, at block 402, the device may access text corresponding to the recorded speech/content that is accessed. For example, a transcription of the recorded speech may be publicly accessible at a same web page as the recorded speech itself, which might be the case if e.g. the public figure had given a public address that was recorded or was narrating an audio book for which a transcription or the book text itself would be made publicly available. As another example, closed captioning text may be associated with the content that is accessed, and that closed captioning text may be accessed along with the content itself.

From block 402 the logic may proceed to block 404. At block 404 the device may extract segments of the recorded speech that are spoken by the public figure that do not include additional speech from other people, assuming the content of the recorded speech includes speech by other people besides the public figure specified by the user. If the content is determined to not include speech by other people, in some embodiments the logic may proceed directly to block 406.

Still in reference to block 404, however, to extract segments of the recorded speech with the public figure speaking that also exclude additional speech from other people that might also be speaking in other parts of the recorded speech, the device may execute voice recognition software using the recorded speech to identify the public figure by voice identification and then identify corresponding temporal segments of the recorded speech in which the public figure is speaking, should enough biometric voice data be available for the public figure for the voice recognition software to identify the public figure by name. As another example, if the public figure is determined to be female and the other person speaking in the recorded speech is determined to be male (or vice versa), the voice recognition software may identify temporal segments of the recorded speech to extract in which a female is identified as speaking. As another example, the extracted segments may include video or visual component that may be used to identify the public figure in the image to then identify the temporal segments of the recorded speech in which the public figure is speaking.

As yet another example, the device may use the closed captioning data accessed at block 402 to determine segments of the recorded speech to extract by timestamps for portions that are spoken by the public figure, where the timestamps may be indicated in the closed captioning data as being associated with respective segments spoken by the public figure. Additionally, or alternatively, the device may match words in the recorded speech using voice recognition) to the same words in the closed captioning data that are indicated as being spoken by the public figure in the closed captioning data.

Also at block 404, in some examples the device may execute voice recognition software to identify a spoken introduction of the public figure by another person to determine that the ensuing speech in the content is that of the public figure, such as if the recorded speech pertained to an award show, television talk show, or dinner in which the other person were introducing the public figure as a guest. Similarly, a reference to the public figure by another person that precedes speaking by the public figure in the recorded speech may be identified using voice recognition to determine that the ensuing speech in the content is that of the public figure. The ensuing speech of the public figure may then be extracted based on identification of one or more temporal segments of the recorded speech in which the public figure is speaking.

The foregoing examples may also apply to instances where, instead of the public figure speaking in his or her actual real-life voice as used in everyday speech with typical tones, inflections, and other manners of speaking as the public figure might employ in real-life, the public figure might be speaking as a fictional character as part of entertainment content. For example, the entertainment content may be a cartoon or animated movie. The foregoing examples may also apply to instances where the public figure is being introduced or referenced in a given piece of fictional content by fictional character name determined to be associated with the public figure (e.g., associated in an Internet movie database with the public figure).

Still further, in some embodiments at block 404 the device may receive user input indicating one or more pieces of content, or particular segments thereof, in which the public figure is speaking. For instance, the user may provide a link to a video of a speech in which only the public figure is speaking. As another example, the user may indicate that the public figure is speaking as a fictional character in a given piece of content during certain segments indicated by the user, and then the device may extract those segments.

Still in reference to FIG. 4, from block 404 the device may then proceed to block 406 where the device may analyze the extracted segments, as well as the corresponding text for the segments that was accessed at block 402 (which may constitute labeling data corresponding to the extracted segments in some examples), to train the text-to-speech DNN to the public figure's voice. The device may train the DNN supervised, partially supervised and partially unsupervised, or simply unsupervised, and may do so at least n part using methods similar to those employed by Acapela Group of Belgium for training its Acapela text-to-speech DNN ("My-Own-Voice") to a given user's voice based on speech recordings of the user (e.g., using Acapela's first-pass algorithm to determine voice ID parameters to define the public figure's digital signature or sonority, and using Acapela's second-pass algorithm to further train the DNN to match the imprint of the public figure's voice with fine grain details such as accents, speaking habits, etc.)

Figure 5:
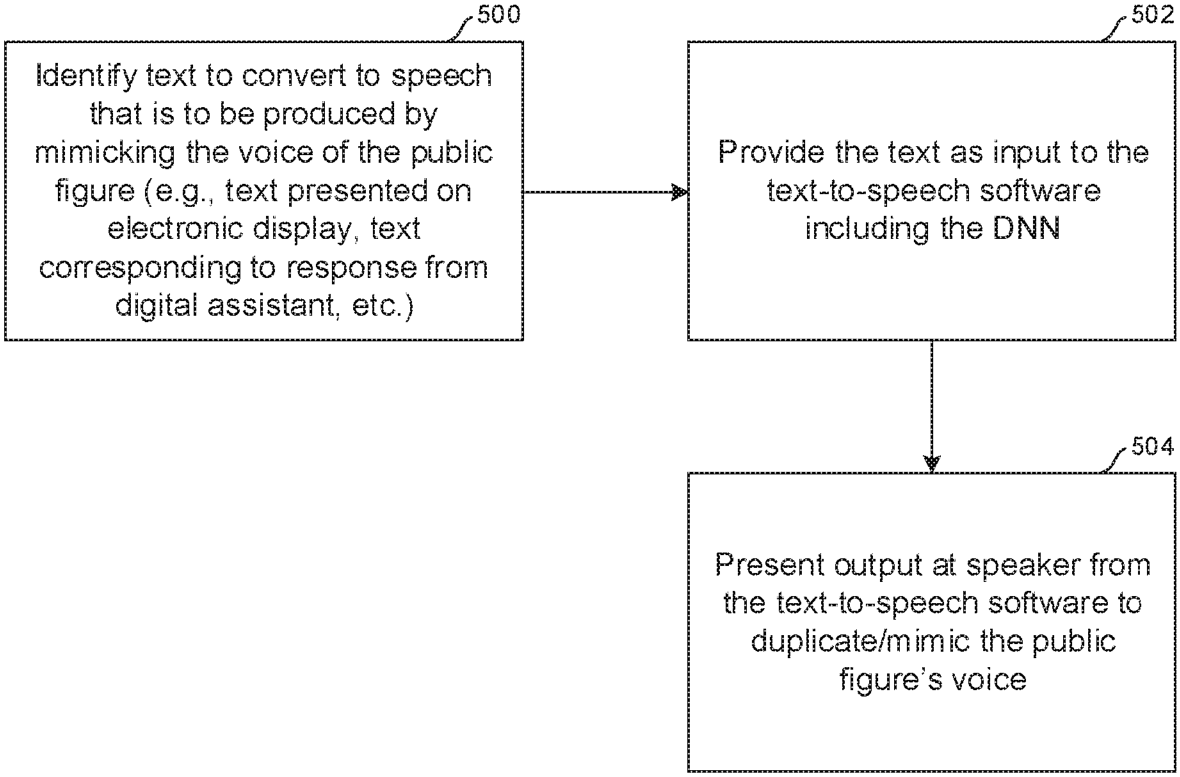
FIG. 5 is a flow chart of example logic for using a trained DNN to mimic the voice of a public figure for a given piece of text consistent with present principles.

Continuing the detailed description in reference to FIG. 5, it shows a flow chart of example logic that may also be executed by a device to mimic the voice of a public figure to output speech in the voice of the public figure based on text accessible to the device or other devices that share the public figure's voice modeling in accordance with present principles. Thus, the device executing the logic of FIG. 5 may be any of the devices disclosed herein, such as the AVDD 12 and/or the server 80.

Beginning at block 500, the device may identify text to convert to computer-generated, audible speech that mimics the voice of the public figure. The text may be text presented on an electronic display as part of, e.g., a television channel guide, text response from digital assistants such as Alexa or Google or Siri, a graphical user interface, a word processing document or other text written by the user, text identified from a photograph taken by the user (e.g., identified using optical character recognition), a short message service (SMS) text message, an email, an electronic calendar entry or event reminder, a device notification such as one pertaining to a SMS text message or email, text of a published book or magazine, etc.

In some embodiments, the text may also be identified at block 500 based on a user command for certain text to be converted into speech for hearing the speech audibly. Still further, in some examples the text may be identified at block 500 as satisfying a query or request for information from the user to a digital assistant application executing at the device so that the text may be converted into speech for audible presentation to the user as a response to the user's query/request for information.

From block 500 the logic may then proceed to block 502 where the device may provide the text as input to the trained text-to-speech DNN as disclosed herein. Then at block 504 the device may receive the corresponding speech output from the DNN that mimics the public figure's voice as speaking the text. Also, at block 504, the device may present the output audibly using a speaker accessible to the device, whether on the device itself or in communication with it via a network connection (e.g., Wi-Fi or Bluetooth).

Referring now to FIG. 6, a graphical user interface (GUI) 600 is shown that is presentable on an electronic display that is accessible to a device undertaking present principles. The GUI 600 may be manipulated to configure one or more settings of the device for undertaking present principles. It is to be understood that each of the settings options to be discussed below may be selected by directing touch or cursor input to a portion of the display presenting the respective check box for the adjacent option.

As shown, the GUI 600 may include a first option 602 that is selectable to enable the device to undertake present principles for mimicking the voice of a celebrity/public figure. For example, the option 602 may be selectable to enable the device to undertake the logic of FIG. 4 and/or FIG. 5.

The GUI 600 may also include options 604, 606, and 608 for selecting various types of text for which to present audible output that duplicates the voice of the celebrity/public figure. As shown, option 604 may be selected to select text presented as part of a television channel guide or associated text, option 606 may be selected to select text identified by a digital assistant for output in response to a query, and option 608 may be selected to select text from notifications presented at the device. However, note that other types of text, such as the other types disclosed herein, may also be presented as options.

As also shown in FIG. 6, the GUI 600 may also include a setting related to specifying one or more particular public figures for voice duplication in accordance with present principles, with it being further understood that in some examples a particular public figure's voice, tone, inflections, other manners of speaking, etc. as used when imitating a fictional character as part of a piece of fictional content may also be used. In any case, preset option 612 for Clint Eastwood and preset option 614 for Albert Einstein may be selected. An "other" option 616 may also be selected and the user may then specify the name of the public figure desired by the user via text input box 614. Furthermore, in some embodiments responsive to one or more of the options being selected for setting 610, the device may then execute pre-processing to ready the device for mimicking the voices) of the selected public figure(s) in the future.

For example, the device may seek out recorded speech of the selected public figures in advance. The device may then configure/train respective DNNs to duplicate the respective public figures' voices and store the trained DNNs in a bank or other storage on or accessible to the user's personal device. The device may then pre-process text predicted by the device as being text that is to be audibly presented in the future (e.g., using machine learning) so that it may be audibly presented at the appropriate time without delay.

Thus, for example, a user might audibly query a digital assistant device for information and specify that the user would like the information presented in a specific public figure's voice (e.g., for only that response rather than as a default setting). Owing to multiple DNNs already being trained as disclosed above, one of which would be trained for the specified public figure, the information responding to the query may then be audibly presented to the user in the voice of the specified public figure without significant delay.

It is to be further understood in accordance with present principles that in some embodiments, a public figure's young or old voice in particular may be mimicked. For instance, the voice of the public figure while in the public figure's youth (e.g., a child star) ay be mimicked while the voice of the public figure once a mature adult may also be mimicked using respective recordings of the of the public figure during those respective stages of the public figure's life to train respective DNNs depending on user preference.

It will be appreciated that whilst present principals have been described with reference to some example embodiments, these are not intended to be limiting, and that various alternative arrangements may be used to implement the subject matter claimed herein.

What is claimed is:

1. An apparatus, comprising:

at least one computer memory that is not a transitory signal and that comprises instructions executable by at least one processor to:

extract recorded speech of a celebrity from at least one piece of content that is publicly available;

analyze the recorded speech of the celebrity;

based on the analysis, configure an artificial intelligence model that can mimic the voice of the celebrity to output additional speech in the voice of the celebrity;

identify text from a television channel guide presented on a television display;

using the artificial intelligence model, convert the text from the television channel guide to speech in the voice of the celebrity to render an audible signal; and play the audible signal on a playback device.

2. The apparatus of claim 1, wherein the instructions are executable to:

analyze the recorded speech to train at least one neural network to mimic the voice of the celebrity, the artificial intelligence model comprising the at least one neural network.

3. The apparatus of claim 2, wherein the at least one neural network is at least in part trained unsupervised.

4. The apparatus of claim 3, wherein the at least one neural network is trained unsupervised at least in part using text that indicates words spoken by the celebrity in the recorded speech.

5. The apparatus of claim 4, wherein the text is associated with closed captioning data corresponding to the recorded speech.

6. The apparatus of claim 4, wherein the at least one neural network is trained unsupervised at least in part using the recorded speech of the celebrity.

7. The apparatus of claim 6, wherein the recorded speech of the celebrity is extracted based on identification of the recorded speech as not including speech from other speakers during one or more segments of the recorded speech.

8. The apparatus of claim 2, wherein the neural network creates a model of the celebrity which may be shared with other devices with text-to-speech engines.

9. The apparatus of claim 2, wherein the at least one neural network is trained at least in part as supervised by a human, the at least one processor receiving an indication from the human that the recorded speech is that of the celebrity.

10. The apparatus of claim 1, wherein the recorded speech is extracted from one or more of: a movie, a television show, other publicly available audio video (AV) content, a publicly available audio recording.

11. The apparatus of claim 1, wherein the additional speech is output using text-to-speech software and text accessible to the at least one processor.

12. The apparatus of claim 1, comprising the at least one processor, and comprising at least one speaker through which the additional speech is output.

13. A method, comprising:

analyzing, using a device, words spoken by a public figure;

based on the analysis, configuring a speech synthesizer to duplicate the public figure's voice for producing audio corresponding to text accessible to the device; and producing the audio as a response to a user's query to a digital assistant.

14. The method of claim 13, wherein the speech synthesizer uses a text-to-speech system to duplicate the public figure's voice.

15. The method of claim 14, wherein the speech synthesizer is configured to employ a deep neural network (DNN) to produce the audio in the voice of the public figure, the DNN trained to the public figure's voice, the DNN establishing at least part of the text-to-speech system.

16. The method of claim 15, comprising:

training the DNN using one or more audio recordings of the words spoken by the public figure and using text indicating the words spoken by the public figure.

17. An apparatus, comprising:

at least one computer readable storage medium that is not a transitory signal, the at least one computer readable storage medium comprising instructions executable by at least one processor to:

use a trained deep neural network (DNN) to produce a representation of a public figure's voice as speaking audio corresponding to first text that is either presented on an electronic display, second text from Closed Captioning, or that is to be used by a digital assistant as part of a response to a query, the trained DNN being trained using both audio of words spoken by the public figure and second text corresponding to the words, the first text being different from the second text.

18. The apparatus of claim 17, wherein the apparatus is embodied in a server, and wherein the server executes the instructions.

19. The apparatus of claim 17, wherein the apparatus is embodied as a consumer electronics device, and wherein the consumer electronic device comprises the electronics display.

* * * * *